US008632405B2

(12) United States Patent
Loose

(10) Patent No.: US 8,632,405 B2
(45) Date of Patent: Jan. 21, 2014

(54) METHOD AND SYSTEM FOR USING MULTI-CHANNEL COMMUNICATIONS TO ENHANCE GAMING SECURITY

(75) Inventor: Timothy C. Loose, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 1232 days.

(21) Appl. No.: 11/568,291

(22) PCT Filed: Apr. 25, 2005

(86) PCT No.: PCT/US2005/014807
§ 371 (c)(1),
(2), (4) Date: Oct. 25, 2006

(87) PCT Pub. No.: WO2005/105244
PCT Pub. Date: Nov. 10, 2005

(65) Prior Publication Data
US 2007/0225075 A1 Sep. 27, 2007
US 2009/0253511 A9 Oct. 8, 2009

Related U.S. Application Data

(60) Provisional application No. 60/565,791, filed on Apr. 26, 2004.

(51) Int. Cl.
A63F 9/24 (2006.01)
A63F 13/00 (2006.01)

(52) U.S. Cl.
USPC .......... 463/40; 463/29; 463/41; 463/42; 713/171

(58) Field of Classification Search
USPC ............... 463/29, 40–42; 713/171
See application file for complete search history.

(56) References Cited

U.S. PATENT DOCUMENTS

| 5,586,257 | A | 12/1996 | Perlman et al. | |
|---|---|---|---|---|
| 5,654,746 | A | 8/1997 | McMullan, Jr. et al. | |
| 5,862,339 | A | 1/1999 | Bonnaure et al. | |
| 6,579,184 | B1 * | 6/2003 | Tanskanen | 463/41 |
| 6,701,344 | B1 | 3/2004 | Holt et al. | |
| 6,725,110 | B2 * | 4/2004 | Suzuki | 700/94 |
| 6,810,528 | B1 * | 10/2004 | Chatani | 725/109 |
| 6,987,947 | B2 * | 1/2006 | Richenstein et al. | 455/3.06 |
| 7,297,062 | B2 * | 11/2007 | Gatto et al. | 463/42 |
| 7,929,697 | B2 * | 4/2011 | McNeely et al. | 380/239 |
| 8,015,595 | B2 * | 9/2011 | Benbrahim | 726/4 |
| 8,316,237 | B1 * | 11/2012 | Felsher et al. | 713/171 |
| 2002/0165023 | A1 * | 11/2002 | Brosnan et al. | 463/29 |
| 2003/0083024 | A1 * | 5/2003 | Richenstein et al. | 455/99 |
| 2004/0092310 | A1 * | 5/2004 | Brosnan et al. | 463/42 |

(Continued)

OTHER PUBLICATIONS

"International Search Report for Application No. PCT/US2005/014087, date mailed Oct. 27, 2005", 4 pgs.

(Continued)

Primary Examiner — Dmitry Suhol
Assistant Examiner — Ryan Hsu
(74) Attorney, Agent, or Firm — Schwegman, Lundberg & Woessner, P.A.

(57) ABSTRACT

A method and system for using multi-channel communications to enhance security is described herein. In one embodiment, the method comprises receiving in a first gaming device a set of gaming data stream portions over a plurality of data channels, wherein the gaming data stream portions are received from a second gaming device. The method further comprises combining ones of the set of gaming data stream portions into a gaming data stream.

17 Claims, 9 Drawing Sheets

(56) References Cited

U.S. PATENT DOCUMENTS

| | | | |
|---|---|---|---|
| 2005/0108414 A1* | 5/2005 | Taylor et al. | 709/231 |
| 2005/0256985 A1* | 11/2005 | Shea | 710/108 |
| 2007/0232396 A1* | 10/2007 | Yoo | 463/42 |

OTHER PUBLICATIONS

.."Written Opinion of the International Searching Authority for Application No. PCT/US2005/014087, date mailed Oct. 27, 2005", 7 pgs.

* cited by examiner

METHOD AND SYSTEM FOR USING MULTI-CHANNEL COMMUNICATIONS TO ENHANCE GAMING SECURITY

RELATED APPLICATIONS

This application is a U.S. National Stage Filing under 35 U.S.C. 371 from International Patent Application Serial No. PCT/US2005/014087, filed Apr. 25, 2005, published on Nov. 10, 2005 as WO 2005/105244 A2, and republished on Jan. 19, 2006 as WO 2005/105244 A3, which claims the benefit of U.S. Provisional Application Ser. No. 60/565,791 filed Apr. 26, 2004, which applications are incorporated herein by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to the field of gaming systems and more particularly to secure gaming system communication techniques.

BACKGROUND

Casino gaming machines (e.g., video slots, video poker, video blackjack, video keno, video bingo, video pachinko, and video lottery) are often configured to operate as part of a host-based gaming network. Host-based gaming networks typically include a number of gaming machines, where each gaming machine is communicatively coupled via a single dedicated data channel (i.e. a non-public data channel) to one or more gaming hosts. In such a configuration, the gaming hosts collect various types of gaming data, such as betting information, payout information, banking information, etc. over the single data channel. One disadvantage of using a single data channel to transmit information between gaming machines and a gaming host is that a single data channel may be difficult to secure. An infiltrator could access to all communications between the gaming machine and the gaming host by breaching the single data channel. Another disadvantage of the single data channel is a lack of bandwidth. Currently, most of the dedicated gaming data channel networks are bandwidth-limited RS232 networks, which operate at 19.2 kbps to 38.4 kbps.

SUMMARY

A method and system for using multi-channel communications to enhance security is described herein. In one embodiment, the method comprises receiving in a first gaming device a set of gaming data stream portions over a plurality of data channels, wherein the gaming data stream portions are received from a second gaming device. The method further comprises combining ones of the set of gaming data stream portions into a gaming data stream.

In one embodiment, the system includes a first gaming device for performing a number of operations. The operations include disassembling a gaming data stream into gaming data stream portions and transmitting the gaming data stream portions. The system also includes a second gaming device for performing the following operations: receiving the gaming data stream portions and assembling the gaming data stream portions into the gaming data stream. The system also includes a plurality of data channels for transmitting gaming data stream portions from the first gaming device to the second gaming device.

BRIEF DESCRIPTION OF THE FIGURES

The present invention is illustrated by way of example and not limitation in the Figures of the accompanying drawings in which.

DESCRIPTION OF THE EMBODIMENTS

Systems and methods for transmitting gaming information over multiple communication channels are described herein. In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Moreover, it should be understood that although the flow diagrams depict serial operations, certain embodiments could perform certain of those operations in parallel.

Overview of Embodiments

Figure 1:
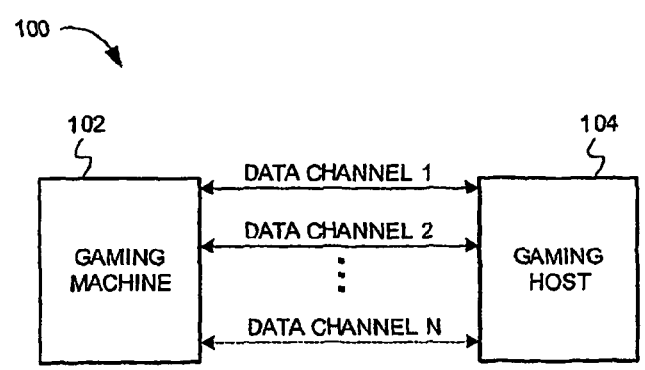
FIG. 1 is a data flow diagram illustrating multi-channel communications between a gaming machine and a gaming host, according to exemplary embodiments of the invention.

This section provides a system overview, according to an embodiment of the invention. FIG. 1 is a data flow diagram illustrating multi-channel communications between a gaming machine and a gaming host, according to exemplary embodiments of the invention. As shown in FIG. 1, gaming system 100 includes a gaming machine 102 and a gaming host 104. The gaming machine 102 is communicatively connected to the gaming host 104 by a set of N data channels, where N is any suitable number of data channels (e.g., N=16). In one embodiment, each data channel is established over a separate transmission medium (e.g. copper wire, fiber optic cable, etc.). Alternatively, each data channel can be established over a common transmission medium using time division or frequency division multiplexing. Moreover, some or all of the data channels can be established using wireless technology.

The data channels can transmit gaming data and security data between the gaming machine 102 and the gaming host 104. According to embodiments, gaming data can include betting information, payout information, banking information, etc., while security information can include passwords, encryption keys, digital certificates, etc. In one embodiment, data channels 1 and 2 can be used for transmitting encrypted betting information from the gaming machine 102 to the gaming host 104. Data channel N can be used for transmitting encryption keys or other security information from the gaming machine 102 to the gaming host 104. Transmitting the betting information and encryption keys over different data channels augments gaming system security because an infiltrator must gain access to several data channels before he can intercept and decrypt the betting information.

Hardware and Operating Environment

This section provides a system level overview of embodiments of the invention. In this section, components of a multi-channel gaming system will be described in greater detail. Operations of the multi-channel gaming system components are described in the following section (see page 9 below).

Figure 2:
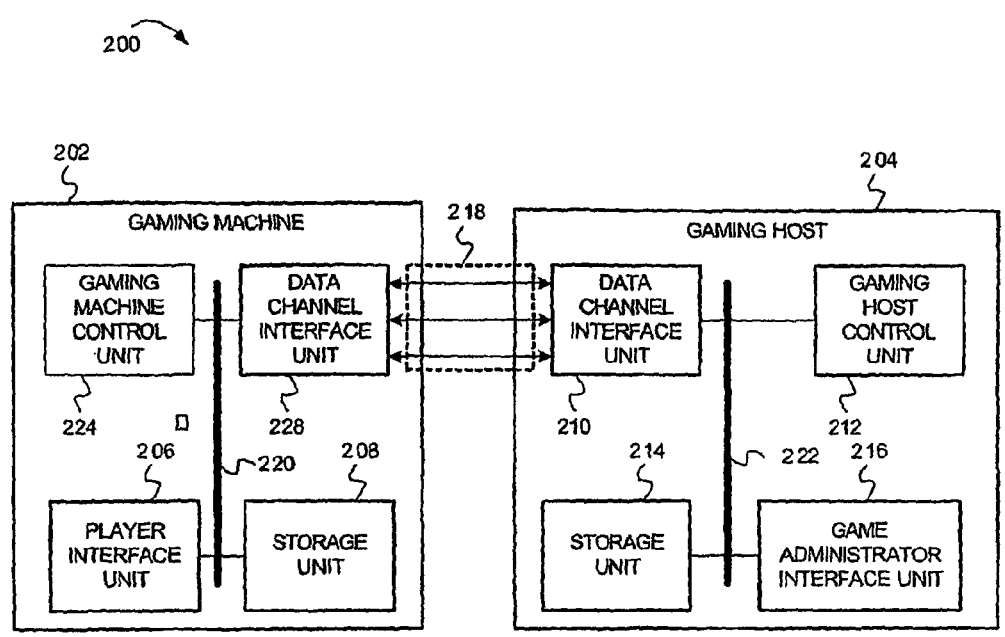
FIG. 2 is a block diagram illustrating a system for transmitting gaming data over multiple data channels, according to exemplary embodiments of the invention.

FIG. 2 is a block diagram illustrating a system for transmitting gaming data over multiple data channels, according to exemplary embodiments of the invention. Gaming system 200 includes a gaming machine 202 and a gaming host 204. The gaming machine 202 is communicatively connected to the gaming host 204 via a plurality of data channels 218. Although the gaming system 200 is depicted having three data channels 218, it can include any suitable number of data channels. As noted above, each of the data channels can be established over a separate transmission medium or the data channels can be established over a common transmission medium. For example, each data channel can be established over a separate Ethernet cable. Alternatively, the data channels can be time or frequency division multiplexed over a single Ethernet cable. In one embodiment, some of the data channels are established using wireless technology (e.g., 802.11g technology), while others are established using various wired technologies (e.g., digital subscriber line network, asynchronous transfer mode network, public switched telephone network, etc.).

The gaming machine 202 includes a gaming machine control unit 224, player interface unit 206, storage unit 208, and data channel interface unit 228. These components communicate with one another over a bus 220. The gaming machine control unit 224 includes hardware, software, and/or other logic for conducting a game, such as video poker, video black jack, slots, etc. For example, the gaming machine control unit 224 can include one or more random number generators for determining outcomes for video slots games. The gaming machine control unit can include other logic used for playing a game.

The gaming machine's storage unit 208 stores data during the operation of the gaming machine 202. The storage unit 208 can be any suitable persistent storage device, such as a disk drive, flash RAM drive, CD-ROM drive, DVD-ROM drive, etc. The storage unit 208 can store information regarding player profiles, current and past player bets, recent payouts, progressive jackpot amounts, and other various gaming and betting information. The storage unit 208 can also store security information, such as digital certificates, encryption keys, passwords, and other trust information.

The player interface unit 206 can include one or more audio and video presentation devices. For example, the player interface unit 206 can include two liquid crystal display monitors and several audio speakers for presenting a game. The player interface unit 206 can also include various input devices, such as buttons and switches, which receive player input during a game.

The gaming machine 202 also includes a data channel interface unit 228 for transmitting and receiving gaming and security information over a plurality of communication channels. The data channel interface unit 228 can include hardware, software, or other logic for preparing data for transmission according to any suitable transmission layer protocol, such as Ethernet, ATM, DSL, etc. The data channel interface unit 228 can also include logic for preparing data for transmission according to any suitable wireless protocol, such as 802.11g. The data channel interface unit 228 can also include logic for encapsulating and decapsulating data according to any protocol layer of the Open Systems Interconnect protocol stack, such as the Transfer Control Protocol (TCP), Internet protocol (IP), datalink protocols, etc. The data channel interface unit 228 can receive data for transmission from any of the gaming machine components. For example, the gaming machine control unit 224 can send betting information to the data channel interface unit 228, which in turn transmits the betting information to the gaming host 204 over a plurality of data channels 218. The data channel interface unit 228 also receives data from the gaming host 204 and forwards it to the appropriate gaming machine component (e.g., the gaming machine control unit 224). Operations for transmitting and receiving gaming and security data over a plurality of data channels will be described in detail in the next section.

As noted above, in addition to the gaming machine 202, the gaming system 200 also includes the gaming host 204. The gaming host includes a data channel interface unit 210, storage unit 214, game administrator interface unit 216, and a gaming host control unit 212. The gaming host components can communicate with each other over a bus 222.

The gaming host's data channel interface unit 210 transmits and receives gaming and security information to and from the gaming machine 202 via the plurality of data channels 218. Like it's gaming machine counterpart, the gaming host's data channel interface unit 210 can include hardware, software, or other logic for preparing data for transmission according to any suitable data transmission protocol, such as ethernet, ATM, DSL, etc. The data channel interface unit 210 can also include logic for data transmission/receipt according to any suitable wireless protocol, such as 802.11g. The data channel interface unit 228 can also include logic for encapsulating and decapsulating data according to any layer of the OSI protocol stack, such as the Transfer Control Protocol (TCP), Internet protocol (IP), datalink protocols, etc. The data channel interface unit 210 receives data over the plurality of data channels and forwards the data to an appropriate gaming host component (e.g., the gaming host control unit 212).

The gaming host's storage unit 214 can be any suitable persistent storage device, such as a disk drive, flash ROM drive, CD-ROM drive, DVD-ROM drive, etc. The storage unit 214 can store gaming and security information, as described above.

The game administrator interface unit 216 can include hardware, software, or other logic for providing an interface through which an administrator can configure the gaming host 204. For example, the game administrator interface unit 216 can include an LCD monitor, keyboard, mouse, and/or any other suitable input/output device. The game administrator interface unit 216 provides an interface through which a gaming administrator can update gaming information, security information, communications settings, etc.

The gaming host control unit 212 is the primary controller for the gaming host 204. The gaming host control unit 212 includes logic for cataloging and organizing gaming and security information. The gaming host control unit 212 determines when selected gaming and security information is transmitted to the gaming machine 202. Additionally, the gaming host control unit can include logic for encrypting and decrypting gaming information. The gaming host control unit 212 can be configured through the game administrator interface unit 216.

The gaming system components (e.g., the gaming machine control unit 224) shown in FIG. 2 can include various processors, application specific integrated circuits (ASICs), memories, and/or machine-readable media for performing operations according to embodiments of the invention. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical, or other forms of propagated signals (e.g., carrier waves, infrared signals, digital signals, etc.), etc. The operations of the components of the gaming machine 202 and the gaming host 204 are described in greater detail below in the next section.

Exemplary Operations

This section describes the exemplary operations of the gaming system described above. In this section, FIGS. 3-8 will be presented. In particular, FIGS. 3 and 4 describes general operations for transmitting and receiving gaming information over a plurality of data channels, while FIGS. 5-8 describe more detailed operations for transmitting and receiving gaming and security information over a plurality of data channels.

Figure 3:
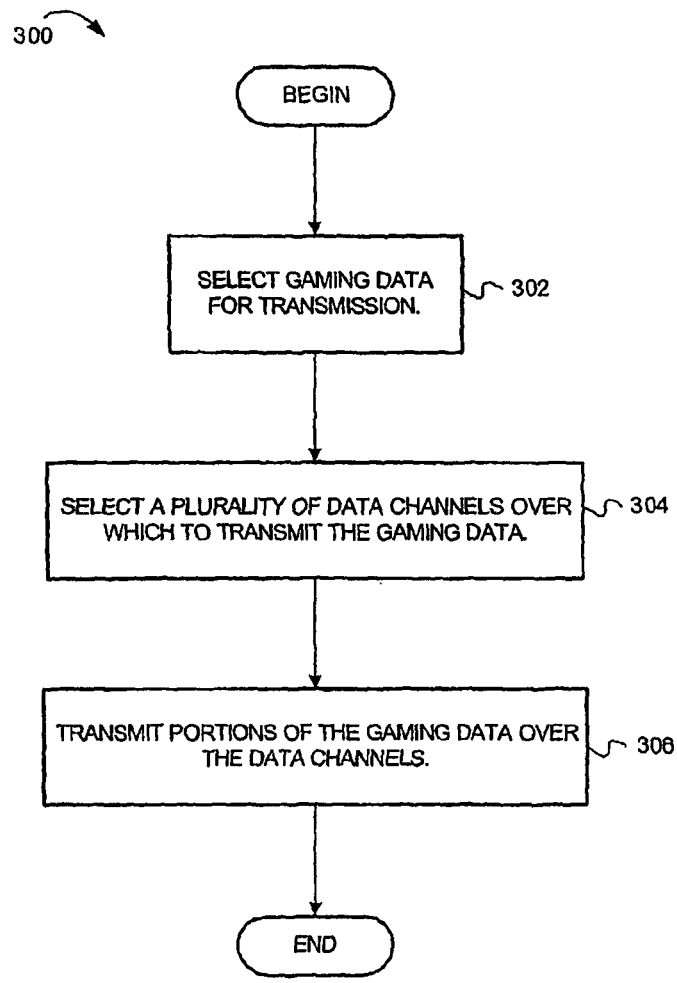
FIG. 3 is a flow diagram illustrating operations for transmitting data over a plurality of data channels, according to exemplary embodiments of the invention.

FIG. 3 is a flow diagram illustrating operations for transmitting data over a plurality of data channels, according to exemplary embodiments of the invention. The flow diagram of FIG. 3 will be described with reference to the gaming system of FIG. 2. The flow diagram 300 commences at block 302.

At block 302, gaming data is selected for transmission. For example, the gaming host control unit 212 selects gaming data for transmission. The gaming host control unit 212 can select gaming data stored within the storage unit 214. The gaming host control unit 212 can disassemble a gaming data stream into a set of smaller data packets, which are suitable for transmission over a data channel. The flow continues at block 304.

At block 304, a plurality of data channels are selected. For example, the gaming host control unit 212 instructs the data channel interface unit 210 to select a plurality of data channels over which to transmit the selected gaming data. The flow continues at block 306.

At block 306, portions of the gaming data are transmitted over the selected data channels. For example, the data channel interface unit 210 transmits portions of the gaming data over each of the data channels 218. Alternatively, portions of the gaming data are transmitted over less than all of the data channels 218. From block 306, the flow ends.

Figure 4:
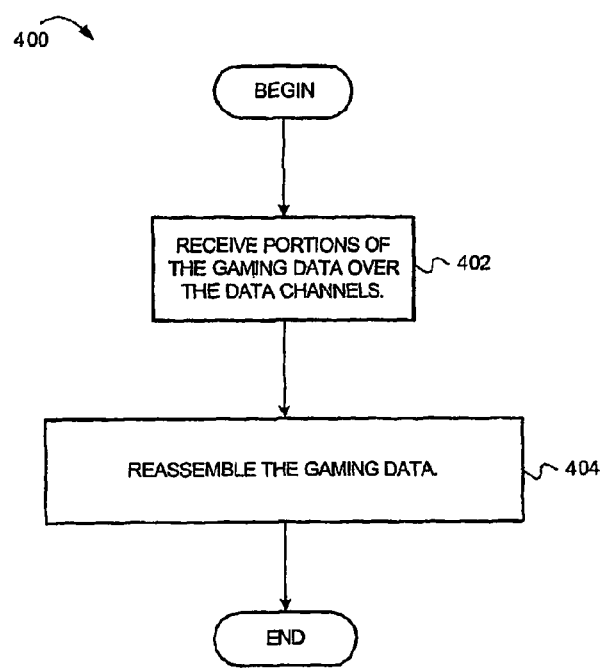
FIG. 4 is a flow diagram illustrating operations for receiving gaming data over multiple data channels, according to exemplary embodiments of the invention.

FIG. 4 is a flow diagram illustrating operations for receiving gaming data over multiple data channels, according to exemplary embodiments of the invention. The flow diagram 400 will be described with reference to the exemplary gaming system shown in FIG. 2. The flow diagram 400 commences at block 402.

At block 402, portions of the gaming data are received over the data channels. For example, the gaming machine's data channel interface unit 228 receives portions of the gaming data over the data channels 218. The flow continues at block 404.

At block 404, the gaming data portions are reassembled. For example, the gaming machine's data channel interface unit 228 reassembled the gaming data portions. The data channel interface unit 228 can forwards the gaming data portions to any of the gaming machine components (e.g., storage unit 208). From block 404, the flow ends.

While FIGS. 3 and 4 describe general operations for transmitting and receiving gaming data over a plurality of data channels, FIGS. 5-8 describe operations for transmitting and receiving gaming data and security information (e.g., encryption keys etc.) over a plurality of data channels.

Figure 5:
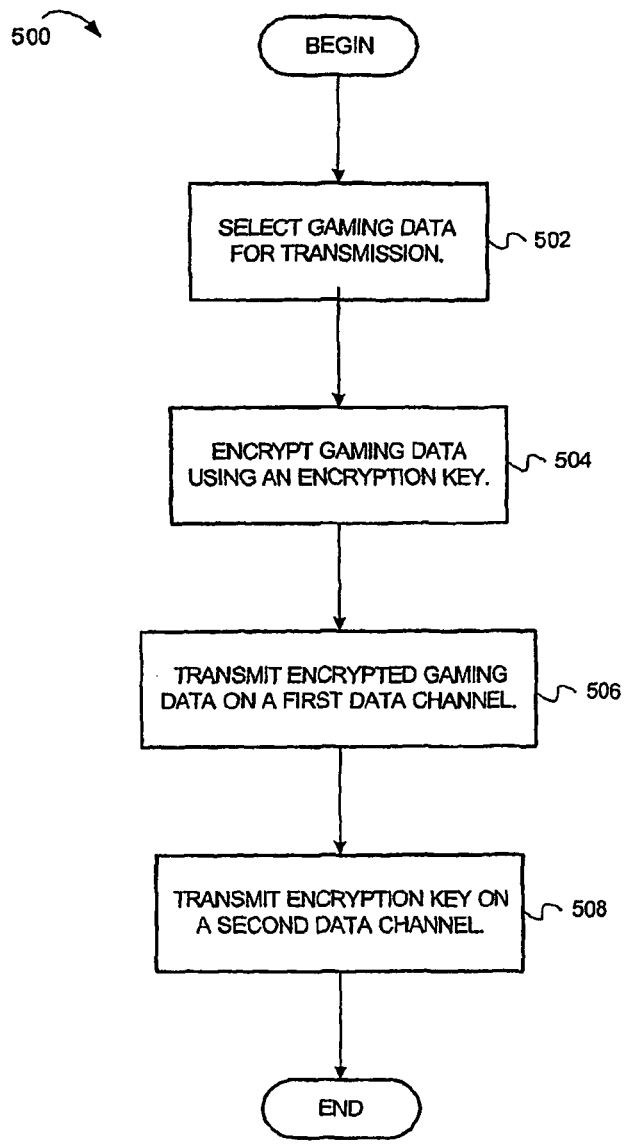
FIG. 5 is a flow diagram illustrating operations for transmitting encrypted gaming data over a first data channel and security information over a second data channel, according to exemplary embodiments of the invention.

FIG. 5 is a flow diagram illustrating operations for transmitting encrypted gaming data over a first data channel and security information over a second data channel, according to exemplary embodiments of the invention. The operations of flow diagram 500 will be described with reference to the exemplary gaming system shown in FIG. 2. The flow diagram 500 commences at block 502.

At block 502, gaming data is selected for transmission. For example, the gaming host control unit 212 selects gaming data for transmission. The gaming host control unit 212 can select gaming data stored in the storage unit 214. Alternatively, the gaming host control unit 212 can select gaming data received through the game administrator interface 216. The flow continues at block 504.

At block 504, the gaming data is encrypted using an encryption key. For example, the gaming host control unit 212 encrypts the selected gaming data using an encryption key.

Any commonly known or specifically developed encryption technique can be used for encrypting the gaming data. The flow continues at block 506.

At block 506, encrypted gaming data is transmitted over a first data channel. For example, the gaming host's data channel interface unit 210 transmits the encrypted the gaming data over one of the data channels 218. The flow continues at block 508.

At block 508, an encryption key is transmitted over a second data channel. For example, the gaming host control unit 212 transmits an encryption key to the data channel interface unit 210, which transmits the encryption key over a different one of the data channels 218. That is, the data channel interface unit 210 transmits the encryption key and the encrypted gaming data over different data channels. From block 508, the flow ends.

Figure 6:
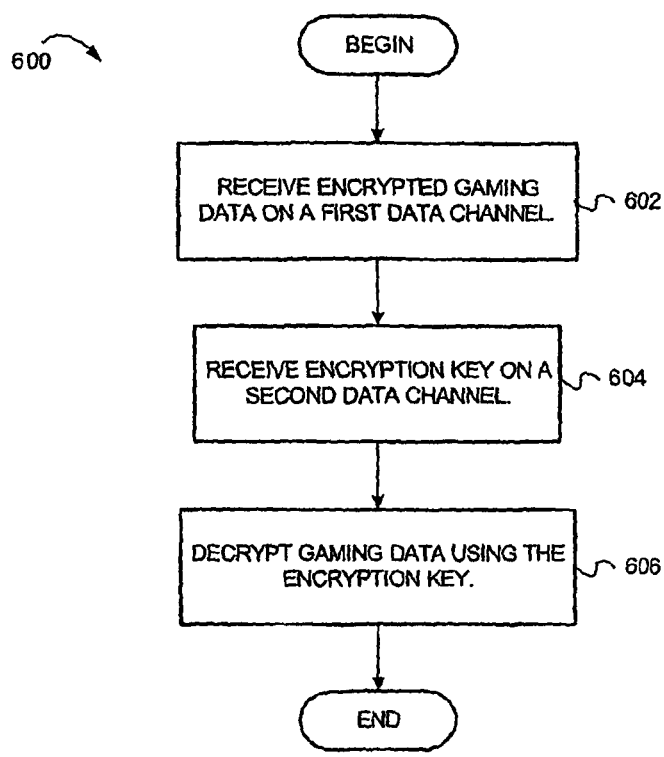
FIG. 6 is a flow diagram illustrating exemplary operations for receiving encrypted gaming data and security information over separate data channels, according to exemplary embodiments of the invention.

FIG. 6 is a flow diagram illustrating exemplary operations for receiving encrypted gaming data and security information over separate data channels, according to exemplary embodiments of the invention. The flow diagram 600 will be described with reference to the exemplary gaming system shown in FIG. 2. The flow diagram 600 commences at block 602.

At block 602, encrypted gaming data is received over a first data channel. For example, the gaming machine's data channel interface unit 228 receives encrypted gaming data over one of the data channels 218. The flow continues at block 604.

At block 604, an encryption key is received on a second data channel. For example, the gaming machine's data channel interface unit 228 receives an encryption key over a second data channel. It should be understood that the encryption key and encrypted gaming data are received over different data channels. The flow continues at block 606.

At block 606, the encrypted gaming data is decrypted using the encryption key. For example, the gaming machine's data channel interface unit 228 forwards the encrypted gaming data and encryption key to the gaming control unit 202, which decrypts the encrypted gaming data. The gaming control unit 202 can store the decrypted gaming data in the storage unit 208. From block 606, the flow ends.

In the following discussion, FIGS. 7 and 8 describe transmitting and receiving interleaved encrypted gaming data over a plurality of data channels.

Figure 7:
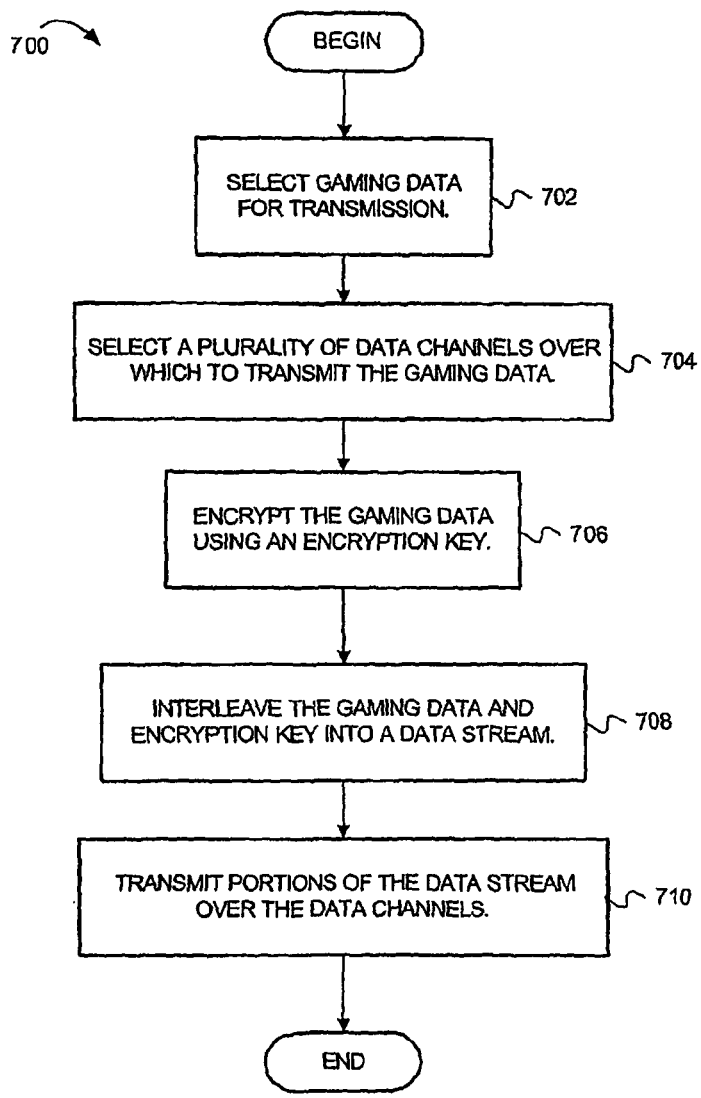
FIG. 7 is a flow diagram illustrating operations for transmitting interleaved encrypted gaming data and encryption information over a plurality of data channels, according to exemplary embodiments of the invention.

FIG. 7 is a flow diagram illustrating operations for transmitting interleaved encrypted gaming data and encryption information over a plurality of data channels, according to exemplary embodiments of the invention. The flow diagram 700 will be described with reference to the exemplary gaming system shown in FIG. 2. The flow diagram 700 commences at block 702.

At block 702, gaming data is selected for transmission. For example, the gaming host control unit 212 selects gaming data for transmission. The gaming host control unit 212 can select gaming data stored in the storage unit 214. The flow continues at block 704.

At block 704, the plurality of data channels are selected. For example, the gaming host's data channel interface unit 210 selects a plurality of data channels over which to transmit the selected gaming data. The data channel interface unit 210 can randomly select the data channels or it can select data channels according to any suitable selection algorithm. The flow continues at block 706.

At block 706, the gaming data is encrypted using an encryption key. For example, the gaming host control unit 212 encrypts the gaming data using an encryption key. The gaming host control unit 212 can employ an encryption algorithm that calls for one or more encryption keys. The flow continues at block 708.

At block 708, the gaming data and encryption key are interleaved into a data stream. For example, the gaming host control unit 212 interleaves portions of the encrypted gaming data and the encryption key in a data stream. The gaming host control unit 212 creates the interleaved data stream by interspersing the encrypted gaming data with one or more encryption keys. The gaming host control unit 212 transmits the interleaved data stream to the data channel interface unit 210 for transmission over the data channels 218. The flow continues at block 710.

At block 710, portions of the data stream are transmitted over the selected data channels. For example, the data channel interface unit 210 transmits portions of the data stream over the plurality of selected data channels 218. In one embodiment, the selected data channels includes all of the data channels 218. Alternatively, the selected group of the data channels includes less than all the data channels 218. From block 710, the flow ends.

Figure 8:
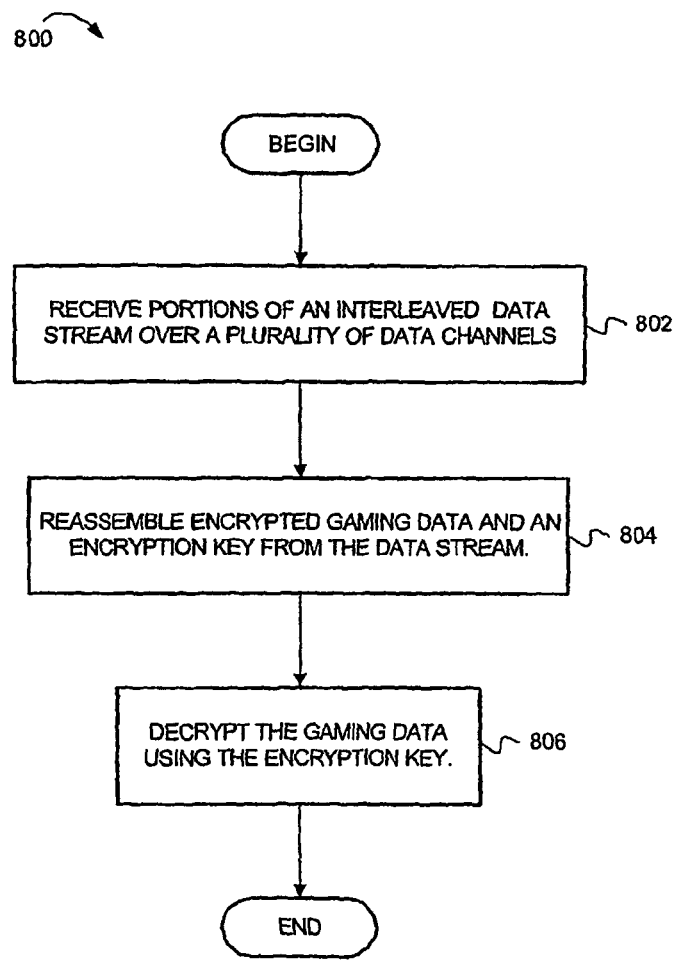
FIG. 8 is a flow diagram illustrating operations for receiving interleaved encrypted gaming data and encryption information over a plurality of data channels, according to exemplary embodiments of the invention.

FIG. 8 is a flow diagram illustrating operations for receiving interleaved encrypted gaming data and encryption information over a plurality of data channels, according to exemplary embodiments of the invention. The flow diagram 700 will be described with reference to the exemplary gaming system shown in FIG. 2. The flow diagram 800 commences at block 802.

At block 802, portions of an interleaved data stream are received over a plurality of data channels. For example, the gaming machine's data channel interface unit 228 receives portions of an interleaved data stream over a plurality of data channels 218. The flow continues at block 804.

At block 804, encrypted gaming data and an encryption keys are reassembled. For example, the gaming machine's data channel interface unit 228 reassembles the encrypted gaming data and encryption key from the data stream portions. If more than one encryption key is received, the additional keys are reassembled. The flow continues at block 806.

At block 806, the gaming data is decrypted using the encryption key. For example, the reassembled encrypted gaming data and encryption key(s) are transmitted to the gaming machine control unit 224, where the encrypted gaming data is decrypted.

Exemplary Gaming Device

Figure 9:
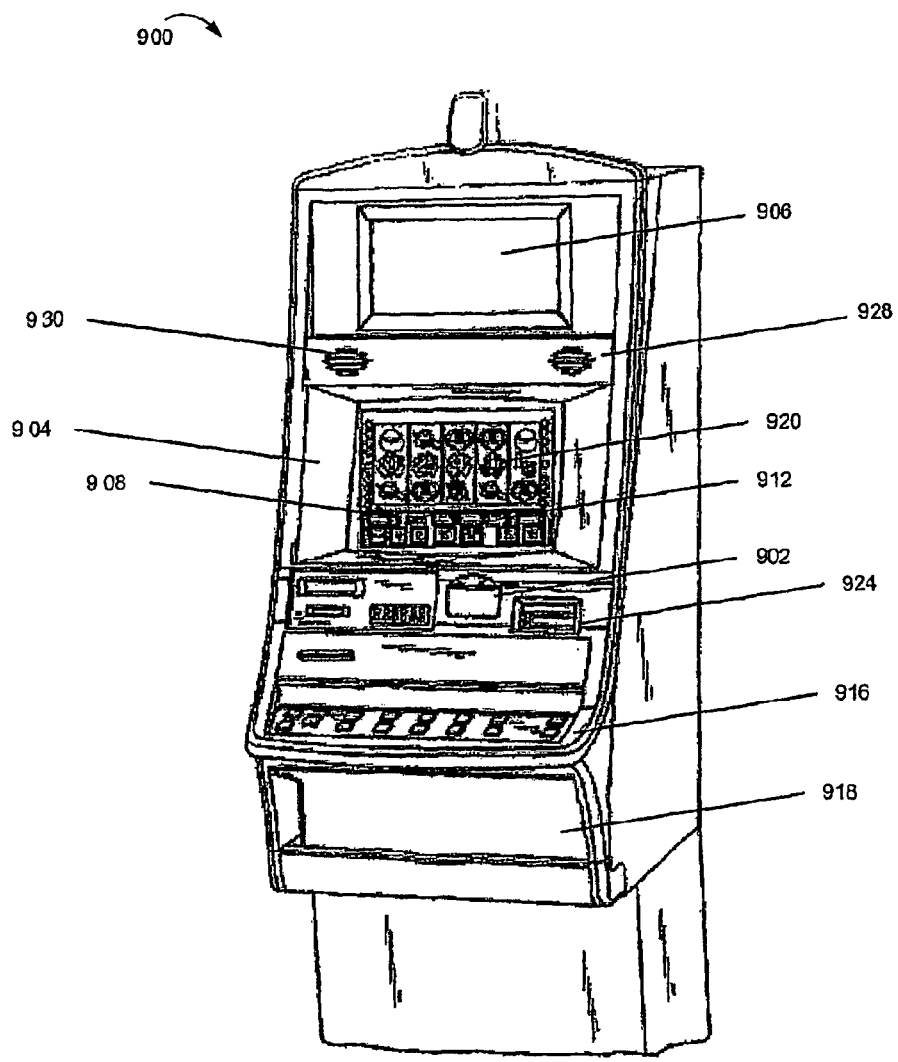
FIG. 9 is a perspective view of a gaming device, according to exemplary embodiments of the invention.

FIG. 9 is a perspective view of a gaming device, according to exemplary embodiments of the invention. As shown in FIG. 9, the gaming device 900 can be a slot machine having the controls, displays, and features of a conventional slot machine. The gaming device 900 can be operated while players are standing or seated. Additionally, the gaming device 900 is preferably mounted on a console. However, it should be appreciated that the gaming device 900 can be constructed as a pub-style tabletop game (not shown), which a player can operate while sitting. Furthermore, the gaming device 900 can be constructed with varying cabinet and display designs. The gaming device 900 can incorporate any primary game such as slot, poker, or keno, and additional bonus round games. The symbols and indicia used on and in the gaming device 900 can take mechanical, electrical or video form.

As illustrated in FIG. 9, the gaming device 900 includes a coin slot 902 and bill acceptor 924. Players can place coins in the coin slot 902 and paper money or ticket vouchers in the bill acceptor 924. Other devices can be used for accepting payment. For example, credit/debit card readers/validators can be used for accepting payment. Additionally, the gaming device 900 can perform electronic finds transfers and financial transfers to procure monies from house financial accounts. When a player inserts money in the gaming device 900, a number of credits corresponding to the amount deposited is shown in a credit display. After depositing the appropriate amount of money, a player can begin playing the game by pushing play button 908. The play button 908 can be any play activator used by the player to start a game or sequence of events in the gaming device 900.

As shown in FIG. 9, the gaming device 900 also includes a bet display 912 and a "bet one" button 916. The player places a bet by pushing the bet one button 916. The player can increase the bet by one credit each time the player pushes the bet one button 916. When the player pushes the bet one button 916, the number of credits shown in the credit display 906 decreases by one, and the number of credits shown in the bet display 912 increases by one.

A player may "cash out" by pressing a cash out button. When a player cashes out, the gaming device 900 dispenses a number of coins, corresponding to the number of remaining credits, into the coin tray 918. The gaming device 900 may employ other payout mechanisms such as credit slips, which are redeemable by a cashier, or electronically recordable cards, which track player credits.

The gaming device 900 also includes one or more display devices. The embodiment shown in FIG. 9 includes a primary display unit 904 and a secondary display unit 906. In one embodiment, the primary display unit 904 displays a plurality of reels 920. In one embodiment, the gaming device displays three reels, while an alternative embodiment displays five reels. In one embodiment, the reels are in video form. According to embodiments of the invention, the display units can display any visual representation or exhibition, including moving physical objects (e.g., mechanical reels and wheels), dynamic lighting, and video images. In one embodiment, each reel 920 includes a plurality of symbols such as bells, hearts, fruits, numbers, letters, bars or other images, which correspond to a theme associated with the gaming device 900. Furthermore, as shown in FIG. 9, the gaming device 900 includes a primary sound unit 928 and a secondary sound unit 930. In one embodiment, the primary and secondary sound units include speakers or other suitable sound projection devices.

The invention claimed is:

1. A method comprising:
  receiving in a first gaming device from a second gaming device, encrypted gaming data over a first data channel between the first gaming device and the second device, the first data channel established using a first protocol over a first transmission medium;
  receiving in the first gaming device from the second gaming device, an encryption key over a second data channel, the second data channel established using a second protocol over a second transmission medium, the second protocol being different than the first protocol and the second transmission medium being separate from the first transmission medium;
  decrypting, at the first gaming device, the received encrypted gaming data with the received encryption key; and
  storing the decrypted game data in a storage device of the first gaming device.

2. The method of claim 1, wherein the first gaming device is a gaming machine and the second gaming device is a gaming host.

3. The method of claim 1, wherein the second data channel is established using a radio frequency protocol, an infrared protocol, a power line protocol, or ethernet protocol.

4. A method comprising:
  performing the following operations in a first gaming device,
    selecting gaming data for transmission;
    encrypting the gaming data using an encryption key;
    transmitting the encrypted gaming data to a second gaming device over a first data channel of a first transmission medium between the first gaming device and a second device, the first data channel established using a first protocol; and
    transmitting the encryption key to the second gaming device over a second data channel of a second transmission medium between the first gaming device and the second device, the second data channel established using a second protocol and the second protocol being different than the first protocol and the second transmission medium being separate from the first transmission medium.

5. The method of claim 4, wherein the first transmission medium is a wired transmission medium.

6. The method of claim 5, wherein the second transmission medium is a wireless transmission medium.

7. A method comprising:
  receiving in a gaming device from a gaming host, a first portion of an interleaved data stream over a first data channel established over a first transmission medium of a plurality of separate transmission mediums, the first portion of the interleaved data stream including a portion of encrypted gaming data and a portion of an encryption key;
  receiving in the gaining device from the gaming host, a second portion of the interleaved data stream over a second data channel established over a second transmission medium of the plurality of separate transmission mediums, the second portion of the interleaved data stream including another portion of the encrypted gaming data and another portion of the encryption key;
  reassembling, at the gaming device, the encrypted gaming data and encryption key using the first and second portions of the interleaved data stream; and
  decrypting, at the gaming device, the encrypted gaming data using the encryption key.

8. The method of claim 7, wherein the gaming device is a gaming machine.

9. A system comprising:
  a first gaming device comprising:
    at least one processor;
    a storage device comprising instructions, which when executed by the at least one processor, configure the processor to:
      encrypt a gaining data stream into an encrypted data stream using an encryption key;
      transmit the encrypted gaming data stream to a second gaming device over a first data channel of a plurality of data channels, the first data channel established over a first transmission medium; and
      transmit the encryption key to the second gaming device over a second data channel of the plurality of data channels, the second data channel established over a second transmission medium separate from the first transmission medium; and
    wherein the first data channel is established using a first protocol selected from the group comprising Ethernet, Asynchronous Transfer Mode, Digital Subscriber Line, and 802.11, and the second data channel is established using a second protocol selected from the group comprising Ethernet, Asynchronous Transfer Mode, Digital Subscriber Line, and 802.11, wherein the first protocol is different than the second protocol.

10. The system of claim 9, wherein the first gaming device is a gaming host and the second gaming device is a gaming machine.

11. The method of claim 4, further comprising randomly selecting the first data channel and the second data channel from a set of available data channels.

12. The method of claim 11, wherein the number of data channels in the set of available data channels is greater than two.

13. A non-transitory computer-readable medium comprising instructions, which when executed by at least one processor, configure the at least one processor to:
 receive in a first gaming device from a second gaming device, encrypted gaming data over a first data channel between the first gaming device and the second device, the first data channel established using a first protocol over a first transmission medium;
 receive in the first gaming device from the second gaming device, an encryption key over a second data channel, the second data channel established using a second protocol over a second transmission medium, the second protocol being different than the first protocol and the second transmission medium being separate from the first transmission medium;
 decrypt, at the first gaming device, the received encrypted gaming data with the received encryption key; and
 store the decrypted game data in a storage device of the first gaming device.

14. The non-transitory computer-readable medium of claim 13, wherein the first gaming device is a gaming host and the second gaming device is a client gaming machine.

15. The non-transitory computer-readable medium of claim 13, wherein the first transmission medium is a wireless transmission medium.

16. The non-transitory computer-readable medium of claim 15, wherein the second transmission medium is a wired transmission medium.

17. The non-transitory computer-readable medium of claim 13, wherein the first and second data channels are randomly selected from a set of available data channels, wherein the number of available data channels is greater than two.

* * * * *

UNITED STATES PATENT AND TRADEMARK OFFICE
CERTIFICATE OF CORRECTION

PATENT NO. : 8,632,405 B2  Page 1 of 1
APPLICATION NO. : 11/568291
DATED : January 21, 2014
INVENTOR(S) : Timothy C. Loose It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1359 days.

Signed and Sealed this
Twenty-second Day of September, 2015

Michelle K. Lee
*Director of the United States Patent and Trademark Office*